Sept. 10, 1963  R. E. GREENE  3,103,204
TAIL HOLDER
Filed Dec. 7, 1961
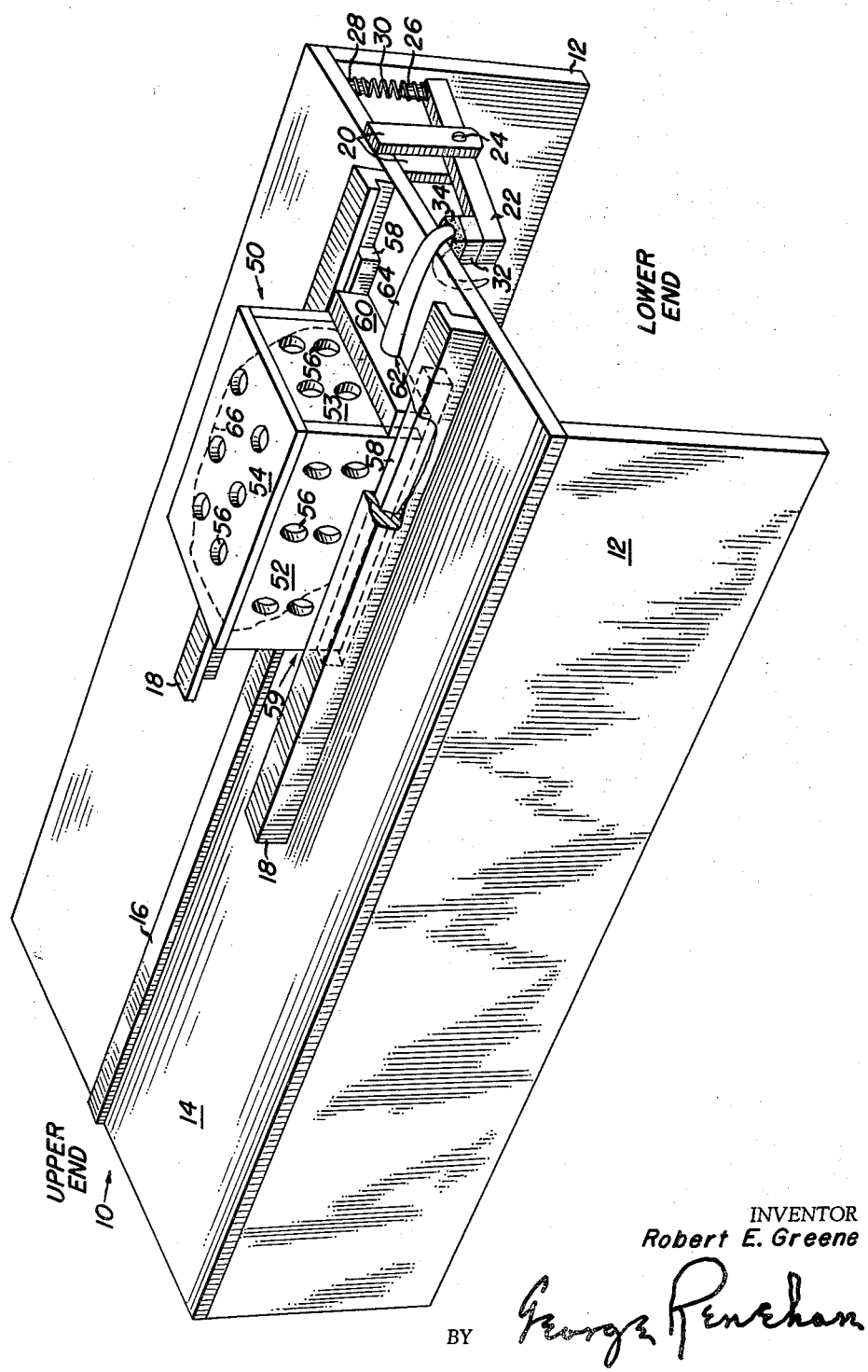
INVENTOR
Robert E. Greene
BY
ATTORNEY

United States Patent Office 3,103,204
Patented Sept. 10, 1963

3,103,204
TAIL HOLDER
Robert E. Greene, Fort Detrick, Md., assignor to the United States of America as represented by the Secretary of the Army
Filed Dec. 7, 1961, Ser. No. 157,861
2 Claims. (Cl. 119—103)
(Granted under Title 35, U.S. Code (1952), sec. 266)

The invention described herein may be manufactured and used by or for the Government of the United States of America for governmental purposes without the payment to me of any royalty thereon.

This invention relates to a device for holding of animals so that they may be more easily inoculated with medicines and drugs, etc. More specifically, the device is mainly used for injecting long tailed small animals which are used for experimentation.

The intravenous administration of solutions into mice is usually done by injection into one of the lateral tail veins. This route of inoculation is often limited because of lack of a satisfactory and simplified apparatus for holding animals during injections. Experimenters have utilized numerous devices in intravenous injections in mice, and one that is most commonly used is a cylindrical device with a rubber stopper cut so that the tail can be brought through it. This apparatus has proved to be quite inefficient for many technicians. There are disadvantages such as crowding of the animal, the problem of placing the animal in the tube, and the hazardous condition that exists when injecting infectious material. Moreover, the technician must hold the tip of the mouse's tail, thereby requiring the aid of an assistant.

A literature search has ascertained that as far back as 1938, scientists have introduced various types of apparatus facilitating intravenous injections. A significant fact noted was that there has been no published material on a simplified device or modification to restrain the tail in place, thus allowing the worker two hands for use in injecting. The mouse tail holder to be herein described has been devised from the necessity of a simple and modified method to immobilize and restrain the mouse tail in place when injecting.

The drawing, which consists of one FIGURE, discloses the isometric view of my tail holder. With reference to the drawing, the tail holder apparatus generally shown at 10 comprises a plastic rectangular device being open at its ends and having a pair of side walls 12 and a top 14. A track 16 is attached to the top 14 and extends from the upper side to about ¾ of the entire length of said top. A pair of holding strips 18 are positioned on either side of said track and these strips are extended approximately one-half the distance of the entire length of said top beginning from its lower side thereof. Each of the holding strips consist of an inverted L-shaped member.

The tail holding mechanism, as shown, comprises two spaced members 20 which extend downwardly from the top 14 at the extreme lower end thereof. A bar or rockable member 22 is pivotally mounted between said vertical members and is held at its medium point by means of a pivot screw 24 which extends through the vertical members and the pivot bar. At one end of said pivot bar there extends upwardly a spring guide 26. A second spring guide 28 extends downwardly from the top 14. A spring 30 is attached at its outer ends to the spring guides 28 and 30. Both spring guides have grooves for holding said spring in place. The spring 30 is long enough to keep the opposed ends of the spring guides 26 and 28 from coming together. At the other end of said pivot bar there is positioned a small extension member or block 32 to the top of which is attached a sponge rubber mat 34. The pressure of the spring 30 normally keeps the sponge rubber pressed against the top 14.

The mouse holder at 50 consists of a plastic rectangular box having an open bottom side, not shown. The sides 52, 53, and 54 all have a plurality of air holes 56. A pair of sliding bars 58 are attached to the lower portion of two side walls. These sliding bars are sized so as to fit within and slide along the holding strips 18. A slot at 59 (not seen) engages with the track 16. A tail holding bar 60 is attached to the lower portion of the rear end of said holder and is also slotted at 62 in order to allow the tail 64 of the mouse 66 to protrude through from the inside of said holder.

In operation, the mouse is placed on the track 16 at the upper end of the device and the holder is placed over the mouse. The tail is drawn out through the slot at 62. The holder is then slid to the lower end where the sliding bars 58 couple with the holding strips 18. The tail is then placed between the top 14 and the sponge rubber mat 34 and held there by means of pressure exerted by spring 30. The operator is then free to use both hands to inoculate the mouse through the holes 56.

It is easily seen that my device provides adequate ventilation for the animal. It is easily constructed and simple in operation. It eliminates any major problem of cleaning and sterilization of the device. Only a single technician is needed to give the inoculation, whereas other devices sometimes require that more than one technician assist in the inoculation. Finally, our device allows a technician to complete more successful inoculations in a given period of time than any other known device.

I claim:
1. An animal holder for use in the intravenous administration of solutions by injection into a vein or veins in the tail of a long-tailed animal, comprising a supporting base, a box-like enclosure having ventilating openings in its walls for the removable confinement therein of a long-tailed animal, and having another opening in an end wall through which and beyond which the animal's tail projects a substantial distance, and animal tail-engaging means on the base located at a point spaced from said end wall opening for gripping the tail near the tip thereof and holding it taut to facilitate injection of the solution, said tail-engaging means including a swingable arm carried by the base and a spring engaging one end of said arm to move its opposite end into said gripping and holding engagement with the tail.

2. An animal holder according to claim 1, wherein a cushion-like pad is mounted on the tail gripping and holding end portion of the swingable arm for engagement with the tail of the animal to prevent discomfort or injury thereto during its confinement.

References Cited in the file of this patent
UNITED STATES PATENTS

| | | |
|---|---|---|
| 2,326,582 | Van Cott et al. | Aug. 10, 1943 |
| 2,540,650 | Brosene et al. | Feb. 6, 1951 |
| 2,603,184 | Cook | July 15, 1952 |
| 2,788,767 | Dooley | Apr. 16, 1957 |